US011066052B2

(12) United States Patent
Panunzio et al.

(10) Patent No.: US 11,066,052 B2
(45) Date of Patent: Jul. 20, 2021

(54) ELECTROMECHANICAL BRAKE BOOSTER AND MANUFACTURING METHOD FOR AN ELECTROMECHANICAL BRAKE BOOSTER

(71) Applicant: Robert Bosch GmbH, Stuttgart (DE)

(72) Inventors: Giammaria Panunzio, Ludwigsburg (DE); Willi Nagel, Remseck/Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 16/489,158

(22) PCT Filed: Feb. 1, 2018

(86) PCT No.: PCT/EP2018/052479
§ 371 (c)(1),
(2) Date: Aug. 27, 2019

(87) PCT Pub. No.: WO2018/162151
PCT Pub. Date: Sep. 13, 2018

(65) Prior Publication Data
US 2019/0389439 A1   Dec. 26, 2019

(30) Foreign Application Priority Data

Mar. 6, 2017 (DE) .......................... 102017203559.5

(51) Int. Cl.
*B60T 13/74* (2006.01)
*B60T 7/04* (2006.01)
(Continued)

(52) U.S. Cl.
CPC .............. *B60T 7/042* (2013.01); *B60T 11/18* (2013.01); *B60T 13/745* (2013.01); *B60T 17/221* (2013.01);
(Continued)

(58) Field of Classification Search
CPC ..... B60T 13/745; F16C 29/002; F16C 29/008
(Continued)

(56) References Cited

U.S. PATENT DOCUMENTS 4,531,419 A * 7/1985 Botz ...................... B60T 13/745
188/360
9,701,296 B2 * 7/2017 Zhang ................... B60T 13/745
(Continued)

FOREIGN PATENT DOCUMENTS

DE           2830262 A1    1/1980
DE      102015218528 A1    4/2016
(Continued)

OTHER PUBLICATIONS

International Search Report for PCT/EP2018/052479, dated May 2, 2018.

*Primary Examiner* — Bradley T King
(74) *Attorney, Agent, or Firm* — Norton Rose Fulbright US LLP; Gerard Messina (57) ABSTRACT

An electromechanical brake booster for a vehicle is described, which includes a housing, a spindle nut operationally engaged with a spindle, an electric motor, with the aid of which the spindle may be set into a translational movement along its spindle axis, a first tie rod and a second tie rod, which are fastened on the housing and extend in parallel to the spindle axis of the spindle, and a bracket fastened on the spindle, a first slide bearing enclosing the first tie rod being situated in a first opening of the bracket and a second slide bearing enclosing the second tie rod being situated in a second opening of the bracket, and the first slide bearing and the second slide bearing each being resiliently clamped in the bracket in a plane perpendicular in relation to the spindle axis. A manufacturing method for an electromechanical brake booster is also described.

10 Claims, 5 Drawing Sheets

(51) Int. Cl.
*B60T 11/18* (2006.01)
*B60T 17/22* (2006.01)
*F16H 25/20* (2006.01)

(52) U.S. Cl.
CPC .. *F16H 25/2018* (2013.01); *F16H 2025/2081* (2013.01)

(58) Field of Classification Search
USPC ........................................................ 74/89.32
See application file for complete search history.

(56) References Cited

U.S. PATENT DOCUMENTS

| | | | |
|---|---|---|---|
| 2012/0090316 A1* | 4/2012 | Philippe | B60T 13/745 60/545 |
| 2019/0047531 A1* | 2/2019 | Nagel | B60T 13/575 |
| 2019/0152462 A1* | 5/2019 | Panunzio | B60T 13/745 |
| 2020/0339090 A1* | 10/2020 | Boehm | B60T 13/161 |
| 2021/0018079 A1* | 1/2021 | Winkler | F16H 25/24 |

FOREIGN PATENT DOCUMENTS

| | | |
|---|---|---|
| EP | 2918462 A1 | 9/2015 |
| FR | 2947228 A1 | 12/2010 |
| JP | S59487 Y | 1/1984 |
| JP | H09100829 A | 4/1997 |
| JP | H09166137 A | 6/1997 |
| WO | 9617759 A1 | 6/1996 |

\* cited by examiner

ELECTROMECHANICAL BRAKE BOOSTER AND MANUFACTURING METHOD FOR AN ELECTROMECHANICAL BRAKE BOOSTER

FIELD

The present invention relates to an electromechanical brake booster for a vehicle and a braking system for a vehicle. Furthermore, the present invention relates to a manufacturing method for an electromechanical brake booster.

BACKGROUND INFORMATION

Figure 1A:
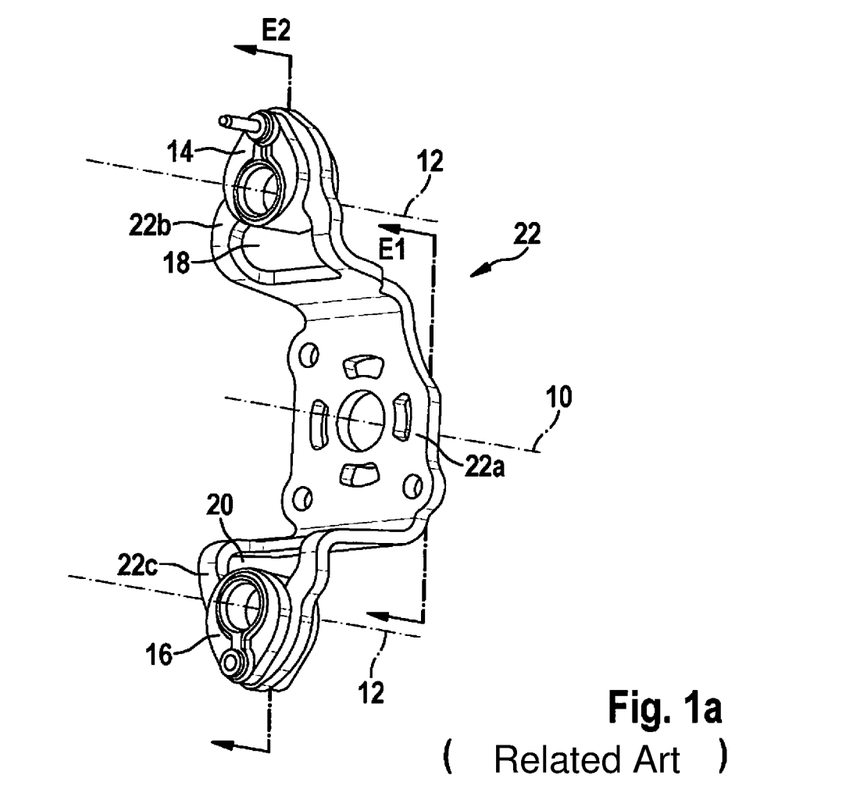
FIGS. 1a and 1b show schematic partial views of a conventional electromechanical brake booster.
Figure 1B:
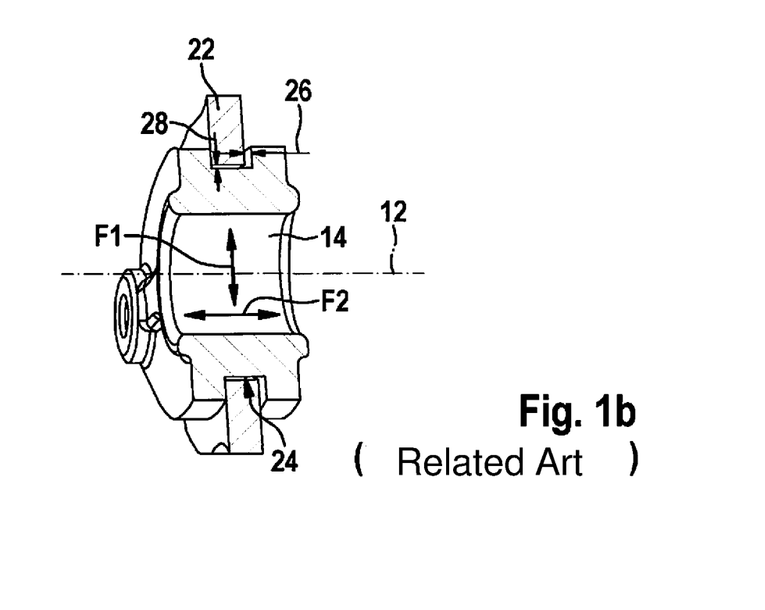

FIGS. 1a and 1b show schematic partial illustrations of a conventional electromechanical brake booster from internal related art.

The electromechanical brake booster shown with the aid of FIGS. 1a and 1b according to the related art includes a spindle nut (not shown) and an electric motor (not shown), with the aid of which the spindle nut may be set into rotation. The spindle nut is operatively engaged with a spindle (not shown), due to which the spindle may be set into a translational movement along its spindle axis 10 with the aid of the spindle nut set into rotation.

The conventional electromechanical brake booster of FIGS. 1a and 1b also includes a housing, however, it is not shown in the figure. A first tie rod (not shown) and a second tie rod (not shown) are each fastened on the housing in such a way that their longitudinal axes 12 extend (essentially) in parallel to spindle axis 10. A first slide bearing 14 encloses the first tie rod. Correspondingly, a second slide bearing 16 encloses the second tie rod. Slide bearings 14 and 16 are each inserted into one opening 18 and 20 of a bracket 22, via which the spindle is guided along the tie rod. Bracket 22 is formed offset in such a way that a middle section 22a of bracket 22 is located in a first plane E1 (perpendicular to spindle axis 10), while a first end section 22b of bracket 22 having first opening 18 formed thereon and a second end section 22c of bracket 22 having second opening 20 formed thereon are formed in a second plane E2 offset in in parallel to first plane E1.

Each of slide bearings 14 and 16 includes a circumferential groove 24, in which an edge area of bracket 22 located at associated opening 18 or 20 engages. Groove 24 formed on first slide bearing 14 is shown enlarged in FIG. 1b. It is apparent that groove 24 is formed in such a way that both a first gap 26 is present in a plane aligned in parallel to spindle axis 10 and also a second gap 28 is present in a spatial direction aligned perpendicularly to spindle axis 10 between an inner wall of particular groove 24 and the engaging edge area of bracket 22. Therefore, both a transverse force F1, which is transmitted with the aid of the rotation of the spindle nut to particular slide bearing 14 or 16, and which is located in a plane aligned perpendicularly in relation to spindle axis 10, and also a friction force F2 exerted on slide bearing 14 or 16 sliding along the associated tie rod therefore effectuate a displacement of the edge area of bracket 22 engaging in groove 24 inside groove 24.

SUMMARY

The present invention provides an electromechanical brake booster for a vehicle, a braking system for a vehicle, and a manufacturing method for an electromechanical brake booster.

The present invention provides an electromechanical brake booster, whose particular spindle is advantageously mounted with the aid of a guide of the spindle along the tie rod in such a way that a tilting effect during the translational movement of the spindle along its spindle axis does not have to be a concern. Instead, transverse forces and torque influences acting/transmitted on the spindle may be compensated for well, so that undesirable tilting/jamming of the spindle may not occur. A slide bearing guide subject to play is implemented with the aid of the resilient clamping of the slide bearing in the bracket in the brake booster according to the present invention, so that different thermal expansions due to different thermal expansion coefficients of the materials of the slide bearing in relation to the bracket may be compensated for. The slide bearing guide subject to play on the brake booster according to the present invention also enables a compensation of angle errors and a compensation of component tolerances. However, in relation to the conventional slide bearing guide as described above, in the brake booster according to the present invention, noise generation due to an impact/striking of an edge area of the bracket protruding into a groove of a slide bearing on a groove inner wall of the particular groove is not a concern. With the aid of the resilient clamping of the slide bearing in the plane aligned perpendicularly in relation to the spindle axis, the formation of a gap between the edge area of the bracket protruding into the groove and the groove inner wall of the particular bracket may be omitted without problems. Therefore, striking noises or clicking also may not be triggered due to closing of the gap. The present invention therefore contributes to increasing the comfort for a driver of a vehicle equipped with the electromechanical brake booster according to the present invention, or the braking system formed with it.

In one advantageous specific embodiment of the electromechanical brake booster, the first slide bearing includes a first rigid U-profile on a first side and a first elastic U-profile on a second side and/or the second slide bearing includes a second rigid U-profile on a first side and a second elastic U-profile on a second side. A first/second slide bearing formed in this way may be provided resiliently clamped in the associated opening of the bracket without problems in such a way that no striking of the slide bearing, in particular a slide bearing groove, on the bracket may occur. Even in the case of a large load and/or a high actuating speed of the particular electromechanical brake booster, a loud noise due to striking of the slide bearing on the bracket is thus not a concern.

Preferably, the first slide bearing is resiliently clamped in the first opening of the bracket in such a way that a torque transmitted to the first slide bearing with the aid of the spindle nut set into rotation is supported with the aid of the first U-profile, and/or the second slide bearing is resiliently clamped in the second opening of the bracket in such a way that a torque transmitted to the second slide bearing with the aid of the spindle nut set into rotation is supported with the aid of the second U-profile. This specific embodiment of the electromechanical brake booster according to the present invention thus utilizes the fact that a torque generally only acts in one defined rotational direction and is supported via transverse forces, which are aligned from the associated tie rod in the direction of the contacted rigid U-profile. Interfering forces in a spatial direction oriented opposite to the transverse forces are rare during normal operation of the electromechanical brake booster. Therefore, the electromechanical brake booster described here includes a particularly advantageous guide of the spindle with the aid of the bracket and the slide bearings advantageously inserted therein on the tie rods.

Preferably, a first stop, which is spaced apart by an intermediate gap from a first ring area of the first slide bearing enclosing the first tie rod, is formed on an inner side of the first elastic U-profile of the first slide bearing, and/or a second stop, which is spaced apart by a further intermediate gap from a second ring area of the second slide bearing enclosing the second tie rod, is formed on an inner side of the second elastic U-profile of the second slide bearing. Even in the case of a relatively high load and/or a comparatively great actuating speed of this specific embodiment of the electromechanical brake booster, striking of the first or second ring area on the adjacent first or second stop may not trigger a striking noise or clicking. Such striking is so strongly damped, that it is not perceptible as noise to a person.

In another advantageous specific embodiment of the electromechanical brake booster, a first groove is formed on the first slide bearing and the first slide bearing clamped resiliently in the first opening of the bracket is held on the first opening with the aid of a first edge area of the bracket engaging in the first groove in such a way that in a spatial direction aligned in parallel to the spindle axis, a gap is provided between the first edge area and the first groove inner wall of the first groove. Accordingly, a second groove may also be formed on the second slide bearing and the second slide bearing clamped resiliently in the second opening of the bracket may be held on the second opening with the aid of a second edge area of the bracket engaging in the second groove in such a way that a further gap is provided between the second edge area and a second groove inner wall of the second groove in a spatial direction aligned in parallel to the spindle axis. In this case, the first and/or second slide bearing is slightly tiltable in all spatial directions in relation to the bracket, so that angle errors and component tolerances may be compensated for.

In another advantageous specific embodiment, first deformation ribs of the first slide bearing are formed on a first area of the first groove inner wall of the first groove located on the first elastic U-profile. Accordingly, second deformation ribs of the second slide bearing may be formed in a second area of the second groove inner wall of the second groove located on the second elastic U-profile. With the aid of such deformation ribs, an installation of the first and/or second slide bearing on the bracket may be facilitated and the installation forces to be applied for this purpose may be reduced.

Preferably, the first slide bearing is fixed in the first opening as a fixed bearing with the aid of a pin pressed into a pin receptacle opening of the first slide bearing and into a further pin receptacle opening of the bracket, while the second slide bearing is displaceably mounted as a movable bearing in the second opening. The spindle is thus displaceable along the tie rod along its spindle axis, without jamming of the first and/or second slide bearing occurring. This may also be described as fixing of the first slide bearing as a fixed bearing in relation to a floating mounting of the second slide bearing as a movable bearing.

The bracket is preferably connected in an axially-fixed and rotationally-fixed manner to the spindle with the aid of a joining method. For example, the bracket may be pressed and/or welded onto the spindle. This ensures a reliable hold of the bracket on the spindle.

The above-described advantages are also ensured in a braking system for a vehicle having such an electromechanical brake booster. It is to be noted that the braking system may be refined according to the above-described specific embodiments of the brake booster.

An execution of a corresponding manufacturing method for an electromechanical brake booster also provides the above-described advantages. Furthermore, the manufacturing method may also be refined according to the above-described specific embodiments of the electromechanical brake booster.

BRIEF DESCRIPTION OF THE DRAWINGS

Further features and advantages of the present invention are explained hereafter on the basis of the figures.

DETAILED DESCRIPTION OF EXAMPLE EMBODIMENTS

FIGS. 2a through 2f show schematic overall and partial views of one specific embodiment of the electromechanical brake booster according to the present invention.

The electromechanical brake booster schematically shown with the aid of FIGS. 2a through 2f may be used as part of a hydraulic braking system in a vehicle/motor vehicle, the usability of the electromechanical brake booster not being limited to a specific braking system type or to a specific vehicle type/motor vehicle type.

Figure 2A:
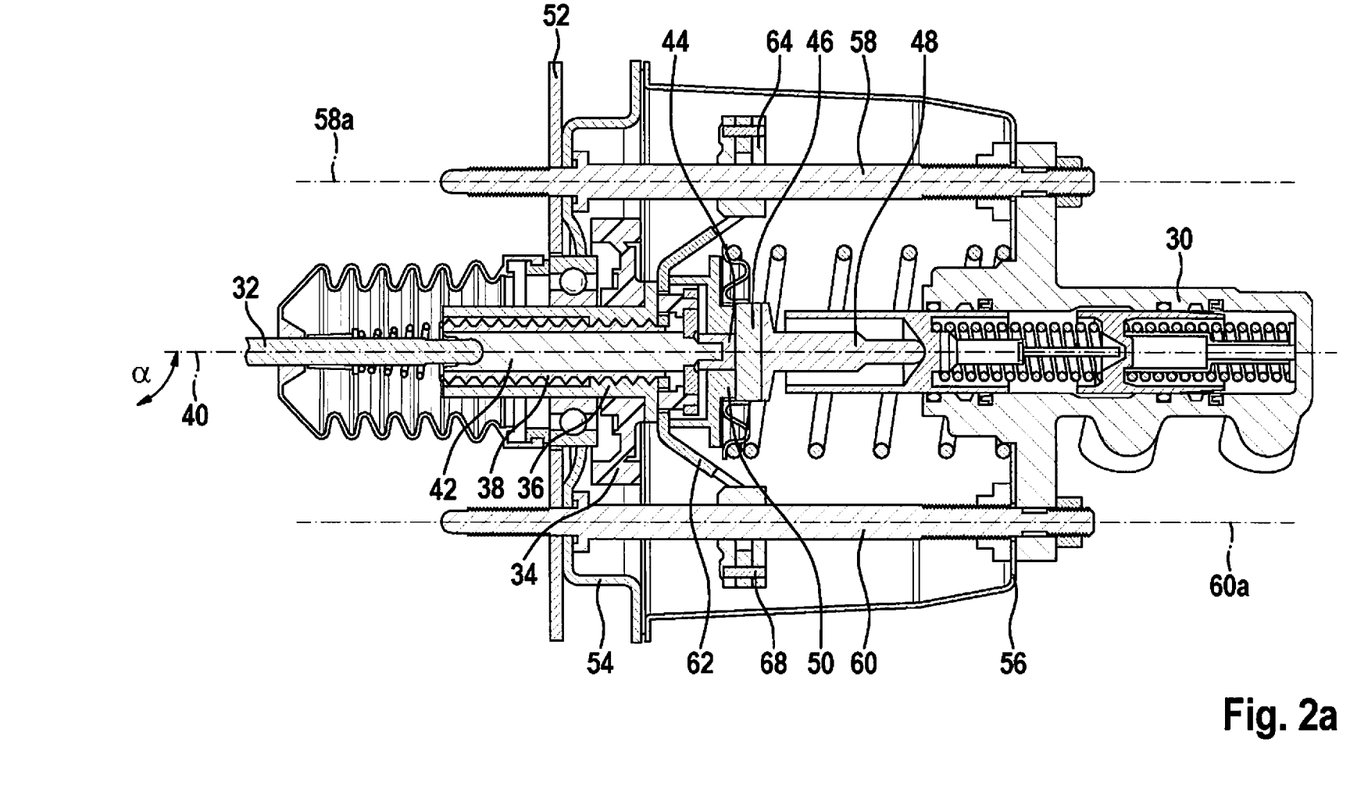
FIGS. 2a through 2f show schematic overall and partial views of one specific embodiment of the electromechanical brake booster according to the present invention.

The electromechanical brake booster shown as the overall illustration in FIG. 2a is situated between a brake pedal (not shown) and a master brake cylinder 30 of the braking system equipped with the electromechanical brake booster in such a way that a driver braking force transmitted to an input rod 32 (downstream of the brake pedal) may be amplified with the aid of the electromechanical brake booster. For this purpose, the electromechanical brake booster includes an electric motor (not shown), which is connected via a gearing 34 to a spindle nut 36, which is operationally engaged with spindle 38, in such a way that spindle nut 36 is set/may be set into a rotation and spindle 38 is set/may be set into a translational movement along its spindle axis 40. For the electric motor, whose illustration is omitted in FIG. 2a, any motor type suitable for an electromechanical brake booster may be used. Spindle nut 36 is set into rotation around spindle axis 40 of spindle 38 with the aid of the operation of the electric motor.

An input piston 42 contacted by input rod 32 is adjustable inside an inner bore extending through spindle 38 along spindle axis 40 in such a way that the driver braking force is transmittable via input piston 42, a pastille 44, and a reaction disk 46 to an output piston 48. A valve body 50, which is adjusted with the aid of the translational movement of spindle 38 along its spindle axis 40, also presses against reaction disk 46, whereby the driver braking force transmitted to output piston 48 may be amplified/is amplified.

In FIG. 2a, a transmission housing base 54 fastened on a vehicle bulkhead 52 and a housing wall 56 are shown as a housing of the electromechanical brake booster. A first tie rod 58, which extends (essentially) in parallel to spindle axis 40 of spindle 38, is fastened on the housing. In addition, a second tie rod 60 is also fastened on the housing in such a way that second tie rod 60 also extends (essentially) in parallel to spindle axis 40 of spindle 38. A first center longitudinal axis 58a of first tie rod 58 and a second middle longitudinal axis 60a of second tie rod 60 are also shown in FIGS. 2a and 2c.

The electromechanical brake booster of FIGS. 2a through 2f also includes a bracket 62 fastened on spindle 38. For example, bracket 62 may be connected in an axially-fixed and rotationally-fixed manner to spindle 38 with the aid of a joining method. In particular, bracket 62 may be pressed and/or welded onto spindle 38. This enables a reliable hold of bracket 62 itself on spindle 38 adjusted along its spindle axis 40 (to ensure the guiding of spindle 38 along tie rods 58 and 60).

A first slide bearing 64 enclosing first tie rod 58 is situated in a first opening 66 of bracket 62. Accordingly, a second slide bearing 68 enclosing second tie rod 60 is situated in a second opening 70 of bracket 62. First slide bearing 64 and/or second slide bearing 68 are preferably made of plastic, in particular of polyoxymethylene or polyamide. A slide bearing 64 or 68 formed in this way may enable a low-friction and low-wear support or guiding of slide bearings 64 and 68 along tie rods 58 and 60.

First slide bearing 64 and second slide bearing 68 are each resiliently clamped in bracket 62 in a plane E perpendicular in relation to spindle axis 40. Slide bearings 64 and 68, which are resiliently clamped in the installed state, are thus relatively free of play in plane E aligned perpendicularly in relation to spindle axis 40. Maintaining a gap in plane E aligned perpendicularly in relation to spindle axis 40 between first slide bearing 64 and a first edge area of bracket 62 enclosing first opening 66 or between second slide bearing 68 and a second edge area of bracket 62 enclosing second opening 70 is thus dispensed with. A movement of first slide bearing 64 in relation to bracket 62 (in particular in plane E aligned perpendicularly in relation to spindle axis 40) and a movement of second slide bearing 68 in relation to bracket 62 (in particular in plane E aligned perpendicularly in relation to spindle axis 40) therefore only occurs if a spring force of the resilient clamping is exceeded. It therefore also does not have to be a concern that such a movement of first slide bearing 64 or second slide bearing 68 in relation to bracket 62 results in striking of first slide bearing 64 or second slide bearing 68 on bracket 62. Such a source of striking noises or clicking noises is therefore reliably remedied.

Since striking of first slide bearing 64 or second slide bearing 68 on bracket 62 (in particular in plane E aligned perpendicularly in relation to spindle axis 40) is not a concern, different materials may be used for bracket 62 and for slide bearings 64 and 68 without problems. Bracket 62 is preferably made of metal. Moreover, bracket 62 may be formed offset in such a way that while a first end section of bracket 62 having first opening 66 formed thereon and a second end section of bracket 62 having second opening 70 formed thereon are located in plane E aligned perpendicularly in relation to spindle axis 40, a middle section of bracket 62 is formed in an offset plane in parallel to plane E.

Figure 2B:
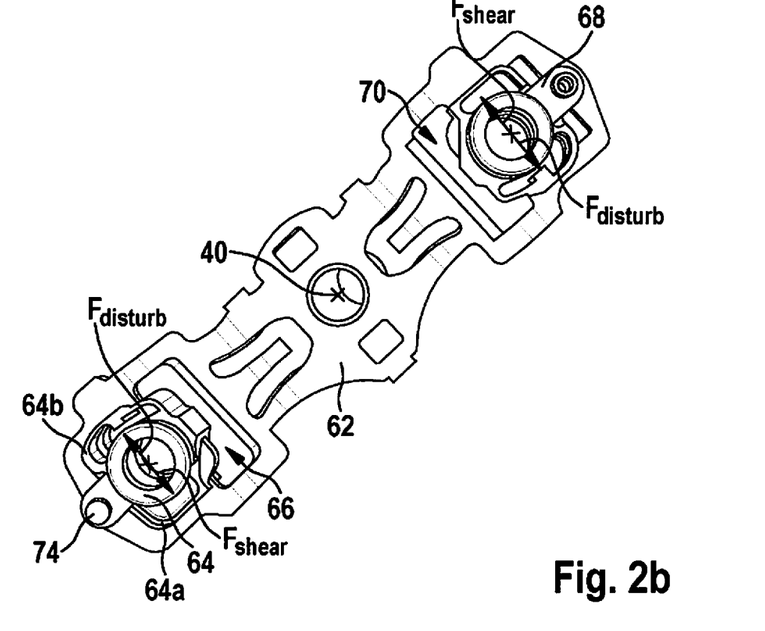
Figure 2C:
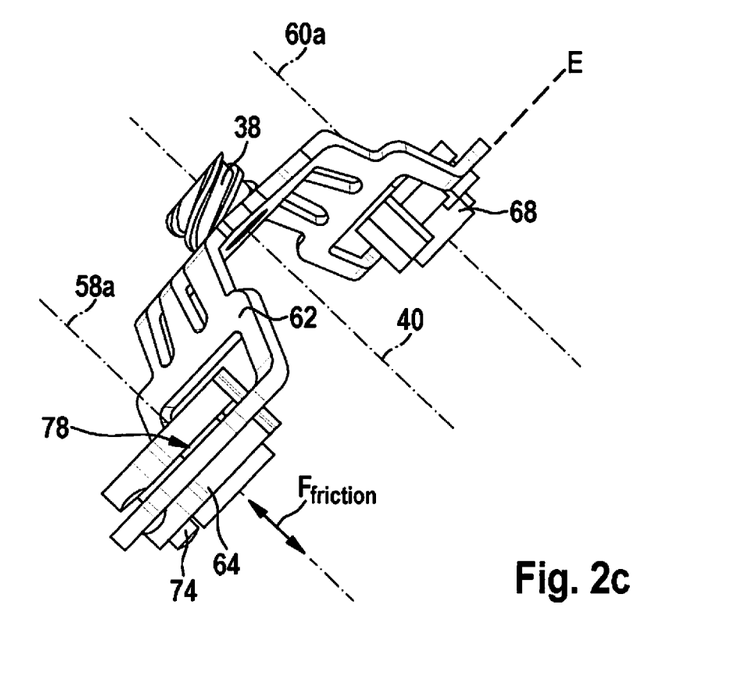

As is apparent in FIGS. 2b and 2c, first slide bearing 64 (as a fixed bearing) is fixed in first opening 66 with the aid of a pin 74 pressed into a first pin receptacle opening 72 (shown in FIGS. 2d through 2f) of first slide bearing 64 and a further pin receptacle opening of bracket 62. Tensile or pressure forces acting on bracket 62 are therefore absorbed/supported by first slide bearing 64 (which executes a master function in relation to second slide bearing 68). In contrast, second slide bearing 68 (as a movable bearing) is displaceably mounted in second opening 70. Second slide bearing 68 is thus displaceable in second opening 70 radially in relation to spindle 38/its spindle axis 40. This may also be described as a floating mounting of second slide bearing 68 in relation to a fixed mounting of first slide bearing 64. Spindle 38 is thus displaceable along first tie rod 58 and second tie rod 60, jamming being suppressed with the aid of the floating support of second slide bearing 68 (which executes a slave function in relation to first slide bearing 64). Slide bearings 64 and 68, which are provided in a master-slave system, thus not only implement a low-friction support of spindle 38 on first tie rod 58 and on second tie rod 60, but rather also a reliable jamming protection.

First slide bearing 64 includes a first rigid U-profile 64a on a first side and a first elastic U-profile 64b on a second side (preferably oriented away from the first side). First elastic U-profile 64b may also be referred to as a first resilient/springy U-profile 64b. This ensures both the desired suppression of a movement of first slide bearing 64 in relation to bracket 62 and also a possible buffering of first slide bearing 64. Second slide bearing 68 also preferably includes a second rigid U-profile 68a on a first side and a second elastic U-profile 68b on a second side, second elastic U-profile 68b being able to be referred to as a resilient/springy U-profile 68b.

First slide bearing 64 is resiliently clamped in first opening 66 of bracket 62 in such a way that a torque transmitted to first slide bearing 64 (with the aid of spindle nut 36 which is set into rotation) is supported with the aid of first rigid U-profile 64a. This may also be described as the force transmitted to first slide bearing 64 causing a transverse force $F_{shear}$, which is oriented in the rotational direction of spindle nut 36. An interfering force $F_{disturb}$ on first slide bearing 64 aligned opposite to transverse force $F_{shear}$ is much rarer in normal operation of the electromechanical brake booster. This may be used to align first slide bearing 64 in first opening 66 in such a way that transverse force $F_{shear}$ exerted thereon is supported with the aid of first rigid U-profile 64a, while rarer interfering force $F_{disturb}$ merely causes a slight deformation of first elastic U-profile 64b. Accordingly, second slide bearing 68 may also be resiliently clamped in second opening 70 of bracket 62 in such a way that a torque transmitted to second slide bearing 68 with the aid of spindle nut 36, which is set into rotation, is supported with the aid of second rigid U-profile 68a.

Figure 2D:
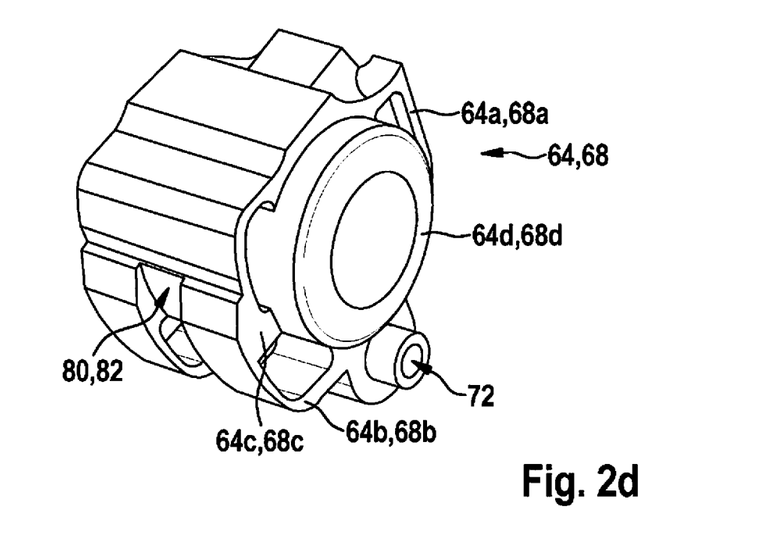
Figure 2E:
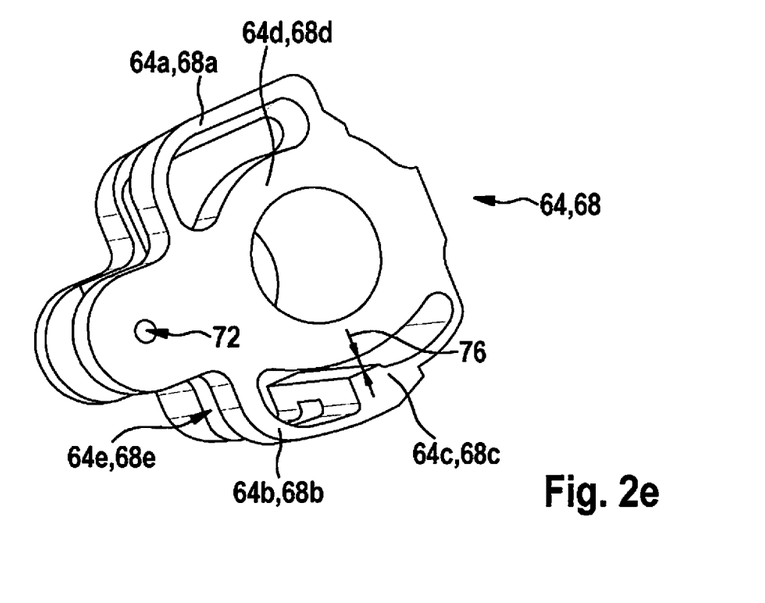
Figure 2F:
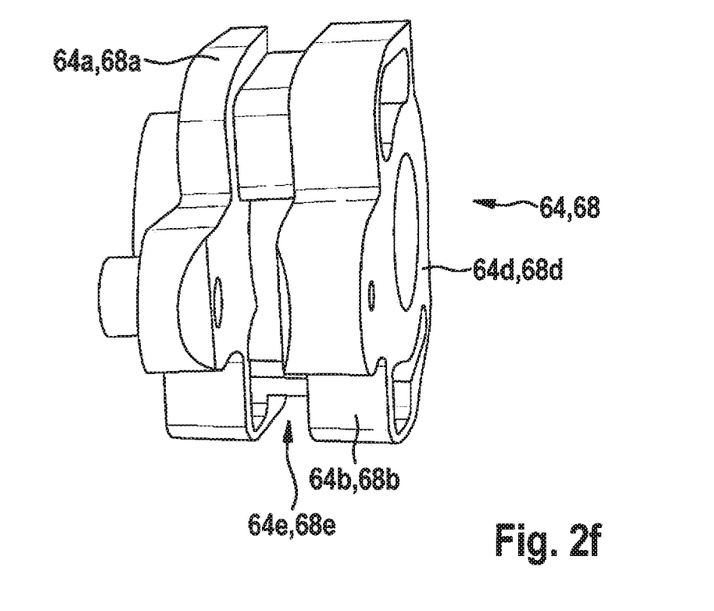

FIGS. 2d through 2f show an enlarged view of first/second slide bearing 64 or 68. A first stop 64c, which is spaced apart by an intermediate gap 76 from a first ring area 64d of first slide bearing 64 enclosing first tie rod 58, is preferably formed on an inner side of first elastic U-profile 64b of first slide bearing 64. First stop 64c is used as an overload protection. Interfering force $F_{disturb}$ may close intermediate gap 76 (in that first stop 64c is brought into contact with first ring area 64d), however, it may not plastically deform first elastic U-profile 64b. In addition, bringing first ring area 64d into contact with first stop 64c is hardly linked to noise generation, since in general a plastic is used for first slide bearing 64. A second stop 68c, which is spaced apart by a further intermediate gap 76 from a second ring area 68d of second slide bearing 68 enclosing second tie rod 60, may also be formed on an inner side of second elastic U-profile 68b of second slide bearing 68 as an overload protection.

It is apparent in FIGS. 2c through 2e that a first groove 64e is formed on first slide bearing 64. First slide bearing 64, which is resiliently clamped in first opening 66 of bracket 62, is held on first opening 66 with the aid of the first edge area of bracket 62 engaging in first groove 64e in such a way that in a spatial direction aligned in parallel to spindle axis 40, a gap 78 exists between the first edge area and a first groove inner wall of first groove 64e (see FIG. 2c). First slide bearing 64 is thus slightly tiltable in relation to bracket 62, which improves jam-free guiding of spindle 38 along first tie rod 58. To prevent jamming of spindle 38, a second groove 68e may also be formed on second slide bearing 68 and second slide bearing 68, which is resiliently clamped in second opening 70 of bracket 62, may be held on second opening 70 with the aid of the second edge area of bracket 62 engaging in second groove 68e in such a way that a further gap 78 exists between the second edge area and a second groove inner wall of second groove 68e in a spatial direction aligned in parallel to spindle axis 430.

Alternately acting friction forces $F_{friction}$ may axially displace slide bearings 64 and 68 within particular gap 78. However, the axial displacement is damped due to the clamping force of resilient U-profile 64b and 68b. This damping causes a prevention of noises. Moreover, occurring friction forces $F_{friction}$ are significantly less than occurring transverse forces $F_{shear}$. (In general, friction force $F_{friction}$ is approximately one-tenth of transverse force $F_{shear}$.)

As is apparent in FIG. 2d, first deformation ribs 80 of first slide bearing 64 are formed in a first area of the first groove inner wall of first groove 64e located on first elastic U-profile 64b. It is also advantageous if second deformation ribs 82 of second slide bearing 68 are formed in an area of the second groove inner wall of second groove 68e located on second elastic U-profile 68b. Due to component tolerances of bracket 62 and slide bearings 64 and 68 and a clamping force of slide bearings 64 and 68, the installation forces may conventionally be comparatively high during an installation of slide bearings 64 and 68. With the aid of deformation ribs 80 and 82, which are slightly deformed in their heights in the case of high installation forces, the installation forces to be applied for the installation of slide bearings 64 and 68 may be reduced, however.

Finally, it is also to be noted that the electromechanical brake booster schematically shown with the aid of FIGS. 2a through 2f may be manufactured cost-effectively and only requires comparatively little installation space.

Furthermore, it is also to be noted that a (hydraulic) braking system for a vehicle having such an electromechanical brake booster also includes the above-described advantages.

Figure 3:
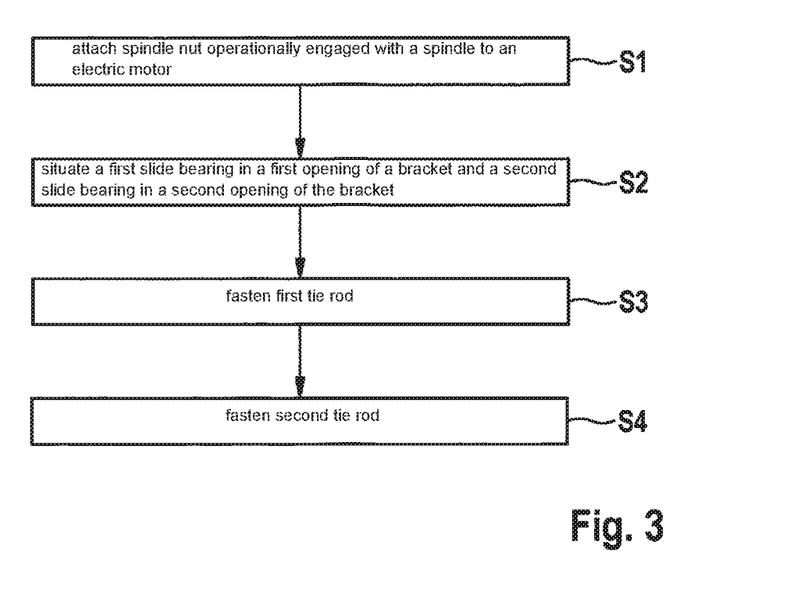
FIG. 3 shows a flow chart to explain one specific embodiment of the manufacturing method for an electromechanical brake booster according to the present invention.

FIG. 3 shows a flow chart to explain one specific embodiment of the manufacturing method for an electromechanical brake booster according to the present invention.

The above-explained electromechanical brake booster may be manufactured with the aid of the manufacturing method described hereafter, for example. However, an ability to carry out the manufacturing method is not restricted to the electromechanical brake booster of FIGS. 2a through 2f.

In a method step S1, a spindle nut operationally engaged with a spindle is attached to an electric motor in such a way that the spindle nut is set into a rotation with the aid of an operation of the electric motor in such a way that the spindle is set into a translational movement along its spindle axis.

In a method step S2, a first slide bearing is situated in a first opening of a bracket fastened on the spindle and a second slide bearing is situated in a second opening of the bracket. The first slide bearing and the second slide bearing are each resiliently clamped in the bracket in one plane. The plane in which the first slide bearing and the second slide bearing are resiliently clamped in the bracket is later (i.e., during the operation of the electric motor/electromechanical brake booster) aligned perpendicularly in relation to the spindle axis.

In a method step S3, a first tie rod is fastened on a housing of the electromechanical brake booster in such a way that the first slide bearing encloses the first tie rod and the first tie rod extends in parallel to the spindle axis of the spindle.

Accordingly, in a method step S4, a second tie rod is fastened on the housing of the electromechanical brake booster in such a way that the second slide bearing encloses the second tie rod and the second tie rod extends in parallel to the spindle axis of the spindle.

Method steps S1 through S4, the sequence of which, described here, is only to be understood as an example, also effectuate the above-described advantages.

What is claimed is:

1. An electromechanical brake booster for a vehicle, comprising:
   a housing;
   a spindle nut operationally engaged with a spindle,
   an electric motor, with the aid of whose operation the spindle nut is set into a rotation in such a way that the spindle is set into a translational movement along a spindle axis of the spindle;
   a first tie rod fastened on the housing and extending in parallel to the spindle axis of the spindle;
   a second tie rod fastened on the housing and extends in parallel to the spindle axis of the spindle; and
   a bracket fastened on the spindle, a first slide bearing enclosing the first tie rod being situated in a first opening of the bracket, and a second slide bearing enclosing the second tie rod being situated in a second opening of the bracket;
   wherein the first slide bearing and the second slide bearing are each resiliently clamped in the bracket in a plane perpendicular in relation to the spindle axis.

2. The electromechanical brake booster as recited in claim 1, wherein the first slide bearing includes a first rigid U-profile on a first side and a first elastic U-profile on a second side and/or the second slide bearing includes a second rigid U-profile on a first side and a second elastic U-profile on a second side.

3. The electromechanical brake booster as recited in claim 2, wherein the first slide bearing is resiliently clamped in the first opening of the bracket in such a way that a torque transmitted to the first slide bearing with the aid of the spindle nut set into rotation is supported with the aid of the first rigid U-profile, and/or the second slide bearing is resiliently clamped in the second opening of the bracket in such a way that a torque transmitted to the second slide bearing with the aid of the spindle nut set into rotation is supported with the aid of the second rigid U-profile.

4. The electromechanical brake booster as recited in claim 2, wherein a first stop, which is spaced apart by an intermediate gap from a first ring area of the first slide bearing enclosing the first tie rod, is formed on an inner side of the first elastic U-profile of the first slide bearing, and/or a second stop, which is spaced apart by a further intermediate gap from a second ring area of the second slide bearing enclosing the second tie rod, is formed on an inner side of the second elastic U-profile of the second slide bearing.

5. The electromechanical brake booster as recited in claim 2, wherein a first groove is on the first slide bearing and the first slide bearing resiliently clamped in the first opening of the bracket is held on the first opening with the aid of a first edge area of the bracket engaging in the first groove in such a way that in a spatial direction aligned in parallel to the spindle axis, a gap is present between the first edge area and a first groove inner wall of the first groove, and/or a second groove is on the second slide bearing and the second slide bearing resiliently clamped in the second opening of the bracket is held on the second opening with the aid of a second edge area of the bracket engaging in the second groove in such a way that in a spatial direction aligned in parallel to the spindle axis, a further gap is present between the second edge area and a second groove inner wall of the second groove.

6. The electromechanical brake booster as recited in claim 5, wherein first deformation ribs of the first slide bearing are formed on a first area of the first groove inner wall of the first groove located on the first elastic U-profile and/or second deformation ribs of the second slide bearing are formed in a second area of the second groove inner wall of the second groove located on the second elastic U-profile.

7. The electromechanical brake booster as recited in claim 1, wherein the first slide bearing is fixed in the first opening as a fixed bearing with the aid of a pin pressed into a pin receptacle opening of the first slide bearing and into a further pin receptacle opening of the bracket, and the second slide bearing is displaceably mounted in the second opening as a movable bearing.

8. The electromechanical brake booster as recited in claim 1, wherein the bracket is connected in an axially-fixed and rotationally-fixed manner to the spindle with the aid of a joining method.

9. A braking system for a vehicle having an electromechanical brake booster, the electromechanical brake booster comprising:
 a housing;
 a spindle nut operationally engaged with a spindle,
 an electric motor, with the aid of whose operation the spindle nut is set into a rotation in such a way that the spindle is set into a translational movement along a spindle axis of the spindle;
 a first tie rod fastened on the housing and extending in parallel to the spindle axis of the spindle;
 a second tie rod fastened on the housing and extends in parallel to the spindle axis of the spindle; and
 a bracket fastened on the spindle, a first slide bearing enclosing the first tie rod being situated in a first opening of the bracket, and a second slide bearing enclosing the second tie rod being situated in a second opening of the bracket;
 wherein the first slide bearing and the second slide bearing are each resiliently clamped in the bracket in a plane perpendicular in relation to the spindle axis.

10. A manufacturing method for an electromechanical brake booster, comprising the following steps:
 attaching a spindle nut provided in an operational engagement with a spindle to an electric motor in such a way that the spindle nut is set into a rotation with the aid of an operation of the electric motor in such a way that the spindle is set into a translational movement along a spindle axis of the spindle;
 arranging a first slide bearing in a first opening of a bracket fastened on the spindle and a second slide bearing in a second opening of the bracket;
 fastening a first tie rod on a housing of the electromechanical brake booster in such a way that the first slide bearing encloses the first tie rod and the first tie rod extends in parallel to the spindle axis of the spindle; and
 fastening a second tie rod on the housing of the electromechanical brake booster in such a way that the second slide bearing encloses the second tie rod and the second tie rod extends in parallel to the spindle axis of the spindle;
 wherein the first slide bearing and the second slide bearing are each resiliently clamped in the bracket in a plane later aligned perpendicularly in relation to the spindle axis.

* * * * *